(12) United States Patent
Szarski et al.

(10) Patent No.: US 10,286,553 B2
(45) Date of Patent: May 14, 2019

(54) METHODS AND SYSTEMS FOR AUTOMATICALLY INSPECTING AN OBJECT

(71) Applicant: THE BOEING COMPANY, Huntington Beach, CA (US)

(72) Inventors: Martin A. Szarski, Canterbury (AU); David Michael Bain, Ashburton (AU); Phillip J. Crothers, Hampton East (AU)

(73) Assignee: THE BOEING COMPANY, Chicago, IL (US)

( * ) Notice: Subject to any disclaimer, the term of this patent is extended or adjusted under 35 U.S.C. 154(b) by 640 days.

(21) Appl. No.: 14/485,909

(22) Filed: Sep. 15, 2014

(65) Prior Publication Data

US 2016/0075020 A1    Mar. 17, 2016

(51) Int. Cl.
*B25J 9/00* (2006.01)
*B25J 9/16* (2006.01)

(52) U.S. Cl.
CPC ... *B25J 9/1664* (2013.01); *G05B 2219/45066* (2013.01); *Y10S 901/44* (2013.01)

(58) Field of Classification Search
None
See application file for complete search history.

(56) References Cited

U.S. PATENT DOCUMENTS

| | | | |
|---|---|---|---|
| 6,101,425 A | 8/2000 | Govindaraj et al. | |
| 6,950,548 B1* | 9/2005 | Bachelder | G06T 7/001 250/559.34 |
| 7,983,790 B2 | 7/2011 | Crothers et al. | |
| 2002/0128790 A1* | 9/2002 | Woodmansee | B23P 6/002 702/81 |
| 2004/0186613 A1 | 9/2004 | Balling | |
| 2010/0023157 A1* | 1/2010 | Burgess | G05B 19/4093 700/186 |
| 2010/0161100 A1 | 6/2010 | Crothers et al. | |
| 2010/0235037 A1 | 9/2010 | Vian et al. | |
| 2010/0314029 A1 | 12/2010 | Lindgren et al. | |
| 2011/0087352 A1 | 4/2011 | Krause | |
| 2014/0259589 A1 | 9/2014 | Ruiwen et al. | |
| 2015/0336331 A1 | 11/2015 | Potter | |

FOREIGN PATENT DOCUMENTS

| | | | |
|---|---|---|---|
| EP | 0369891 A2 | 5/1990 | |
| EP | 2204710 A1 | 7/2010 | |

OTHER PUBLICATIONS

EPO Extended Search Report for related application 15201161.5 dated Jun. 2, 2016; 7 pp.
EP Examination Report for related application EP15201161.5 dated Jan. 5, 2018; 4 pp.
EP Examination Report for related application 15201161.5 dated Jun. 27, 2018; 4 pp.

* cited by examiner

*Primary Examiner* — Paul B Yanchus, III
(74) *Attorney, Agent, or Firm* — Armstrong Teasdale LLP

(57) ABSTRACT

A system includes a robotic device for moving an inspection tool, a scanner coupleable to the robotic device such that the robotic device is configured to automatically move the scanner to collect data associated with a surface of the object, and a computer system configured to determine a surface profile associated with the surface of the object based on the data, and generate a tool path for inspecting the object using the inspection tool based on the surface profile.

12 Claims, 4 Drawing Sheets

METHODS AND SYSTEMS FOR AUTOMATICALLY INSPECTING AN OBJECT

BACKGROUND

The field of the disclosure relates generally to inspection systems, and, more particularly, to methods and systems for automatically inspecting an object.

Objects are often inspected to facilitate maintaining a desired level of quality and/or consistency. Many inspections are performed manually by a trained operator holding an inspection probe. For example, the trained operator may manually position the inspection probe in a plurality of inspection positions with respect to an object being inspected. Manual inspections, however, may be tedious and/or time consuming. To at least partially address these issues, some known inspection devices include a robot that operates based on a nominal path from computer-aided design (CAD) data. However, at least some known objects do not have relevant CAD data and/or are not consistent with the available CAD data. Accordingly, inspection of such objects generally requires iterative and manual adjustment of the inspection device to maintain a desired inspection path, which may be tedious and/or time consuming, particularly for complex surfaces that require a plurality of inspection positions.

BRIEF SUMMARY

In one aspect, a method is provided for automatically inspecting an object. The method includes automatically moving, using a robotic device for moving an inspection tool, a scanner to collect data associated with a surface of the object, determining a surface profile associated with the surface of the object based on the data, and generating a tool path for inspecting the object using the inspection tool based on the surface profile.

In another aspect, a system is provided for automatically inspecting an object. The system includes a robotic device for moving an inspection tool, a scanner coupleable to the robotic device such that the robotic device is configured to automatically move the scanner to collect data associated with a surface of the object, and a computer system configured to determine a surface profile associated with the surface of the object based on the data, and generate a tool path for inspecting the object using the inspection tool based on the surface profile.

In yet another aspect, one or more computer-readable storage media having computer-executable instructions embodied thereon is provided. When executed by at least one processor, the computer-executable instructions cause the processor to automatically move, using a robotic device for moving an inspection tool, a scanner to collect data associated with a surface of the object, determine a surface profile associated with the surface of the object based on the data, and generate a tool path for inspecting the object using the inspection tool based on the surface profile.

The features, functions, and advantages described herein may be achieved independently in various embodiments of the present disclosure or may be combined in yet other embodiments, further details of which may be seen with reference to the following description and drawings.

Figure 1:
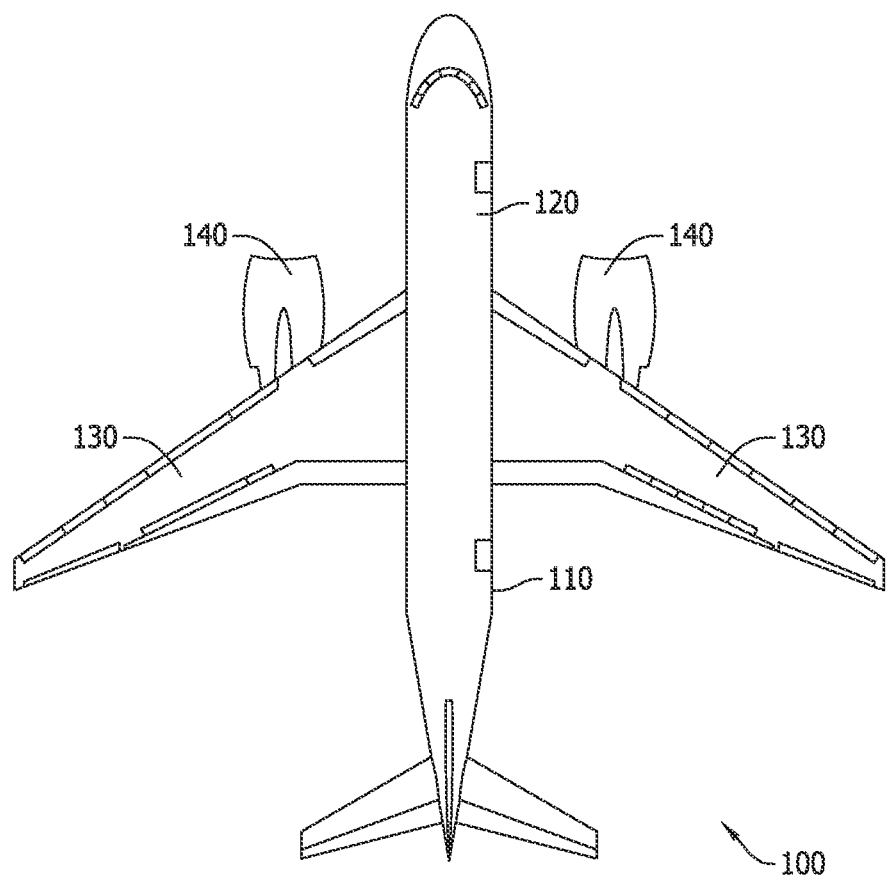
FIG. 1 is a plan view of an example aircraft.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

The subject matter described herein relates generally to inspection systems and, more particularly, to methods and systems for automatically inspecting an object. In one embodiment, a system includes a robotic device, a scanner coupleable to the robotic device, and a computer system. The robotic device automatically moves the scanner to collect data associated with a surface of the object, and the computer system determines a surface profile associated with the surface of the object based on the data, and generates a tool path for inspecting the object based on the surface profile. The embodiments described herein enable objects to be inspected automatically and systematically, thereby reducing a number of touches by a user operator.

The methods and systems described herein may be implemented using computer programming or engineering techniques including computer software, firmware, hardware, or any combination or subset thereof, wherein the technical effects may be achieved by performing at least one of the following steps: (a) automatically couple the scanner to the robotic device; (b) automatically move a scanner to collect data associated with a surface of the object; (c) determine a surface profile associated with the surface of the object based on the data; (d) generate a three-dimensional map of the surface within a predetermined coordinate system associated with the robotic device; (e) generate a tool path for inspecting the object based on the surface profile; (f) automatically decouple the scanner from the robotic device; (g) automatically couple an inspection tool to the robotic device; and (h) automatically move an inspection tool along the tool path to perform a non-destructive inspection of the object.

The following detailed description illustrates embodiments of the disclosure by way of example and not by way of limitation. It is contemplated that the disclosure has application to inspection methods and systems, in general, to facilitate increasing accuracy and/or precision associated with inspections, decreasing inspection time, and/or increasing throughput and/or productivity.

An element or step recited in the singular and preceded with the word "a" or "an" should be understood as not excluding plural elements or steps unless such exclusion is explicitly recited. Moreover, references to "one embodiment" of the present invention and/or the example embodiment are not intended to be interpreted as excluding the existence of additional embodiments that also incorporate the recited features.

FIG. 1 is a plan view of an example aircraft 100. In the example embodiment, aircraft 100 includes a body 110 including a fuselage 120 and a pair of wings 130 extending from fuselage 120. In the example embodiment, at least one engine 140 is coupled to each wing 130 to provide thrust to aircraft 100. Aircraft 100, and its component parts, includes a plurality of objects that are each inspectable using an inspection system, as described herein.

Figure 2:
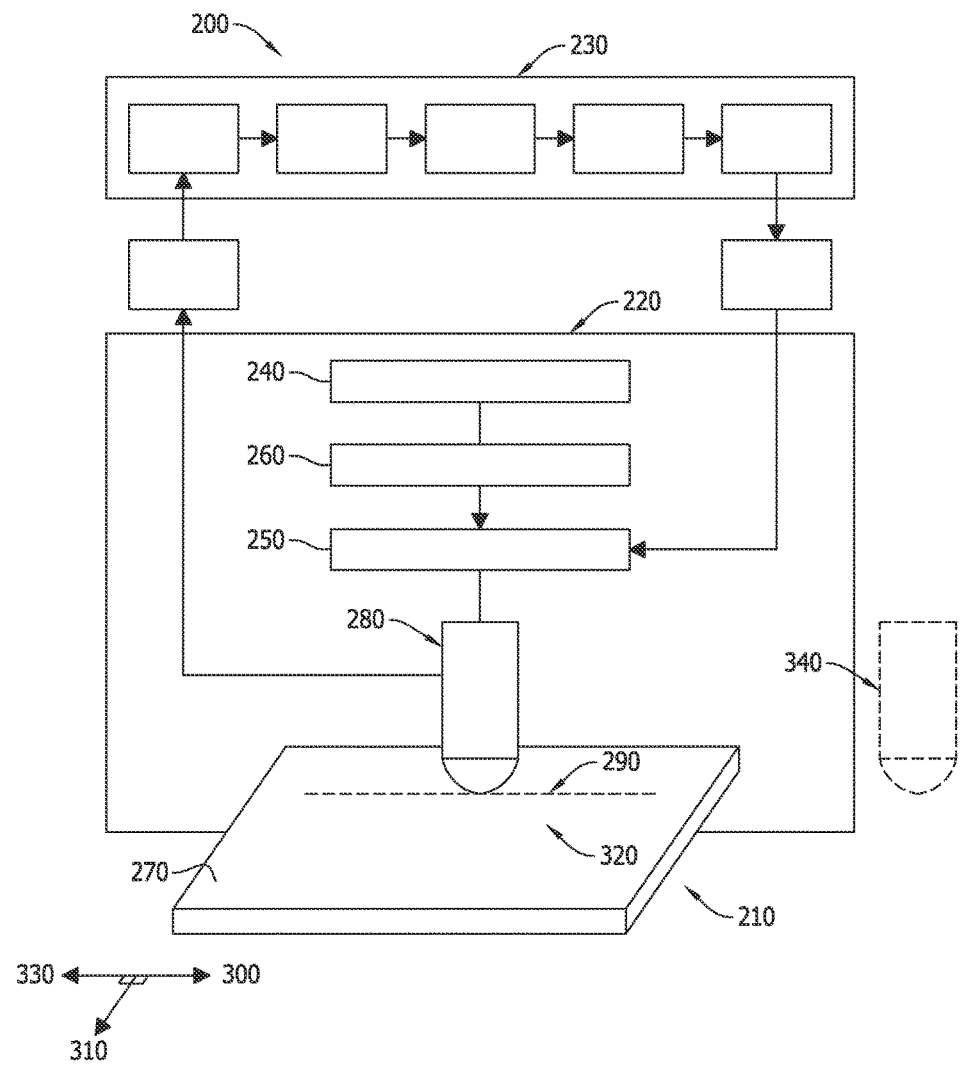
FIG. 2 is a schematic illustration of an example inspection system that may be used in inspect an object.

FIG. 2 is a schematic illustration of an example inspection system 200 that may be used in inspect an object 210, for example, an object from aircraft 100. In the example embodiment, inspection system 200 includes a robotic device 220, and a controller (e.g., computer device and/or system) 230 configured to control an operation of inspection system 200. In the example embodiment, robotic device 220 is a free-standing structure positioned adjacent to object 210 to be inspected. Alternatively, robotic device 220 may be coupled and/or mounted directly to object 210 via a coupling mechanism, such as a suction cup and/or strap.

In the example embodiment, robotic device 220 includes a robot body 240 and a robot arm 250 extending from and/or supported by robot body 240. In the example embodiment, robot arm 250 is moveable along multiple axes within a predetermined coordinate system associated with robotic device 220 via a robot driver 260 controlled by controller 230. Accordingly, in the example embodiment, motion instructions may be used to bend, twist, spiral, and/or turn robotic body 240 and/or robotic arm 250 within a three-dimensional space such that robotic body 240 and/or robotic arm 250 are desirably positioned, moved, and/or orientated with respect to object 210.

A plurality of tools are coupleable to robotic device 220, such that controller 230 is configured to position, move, and/or orient the tool coupled to robotic device 220 with respect to object 210 and control an operation of the coupled tool and/or robotic device 220. In the example embodiment, robot arm 250 includes a plurality of jointed segments and is controlled via robot driver 260 to selectively position, move, and/or orient the tool coupled to robotic device 220 with multiple degrees of freedom adjacent to and/or over a surface 270 of object 210. Particularly, robotic device 220 is configured to maintain the coupled tool within approximately 6 inches (in.) of surface 270 of object 210. More particularly, the coupled tool is maintained between approximately 4.0 in. and approximately 5.0 in. of surface 270 of object 210. Alternatively, the coupled tool may be positioned, moved, and/or oriented in any manner that enables inspection system 200 to function as described herein.

In the example embodiment, a scanner 280 is removeably coupleable to robotic device 220 such that, when scanner 280 is coupled to robotic device 220, robotic device 220 is configured to automatically move scanner 280. Scanner 280 may be, without limitation, a laser line scanner, an optical sensor, a camera, an infrared sensor, an ultrasonic sensor, an eddy current sensor, a vibration sensor, a magnetometer, a temperature probe, a microphone, a speaker, a capacitance-based gap measurement meter, an electrical multimeter, a voltage meter, a resistance meter, a current meter, a conductivity meter, a static charge meter, and/or any combination of the aforementioned components. In one embodiment, scanner 280 includes and/or is coupled to at least one accelerometer that measures linear acceleration and/or a gyroscope that measures rotational velocity.

In the example embodiment, scanner 280 is automatically moved in a plurality of passes to collect data associated surface 270. Each pass is associated with a respective portion of surface 270. For example, in one implementation, scanner 280 is moved along a first portion 290 of surface 270 in a first direction 300, is shifted (i.e., moved) in a second direction 310 substantially perpendicular to first direction 300, and is moved along a second portion 320 of surface 270 substantially parallel to first portion 290 in a third direction 330 substantially opposite first direction 300. In such an implementation, scanner 280 is shifted in second direction 310 and the process is repeated. Alternatively, scanner 280 may be moved in any direction using any pattern that enables inspection system 200 to function as described herein.

In the example embodiment, scanner 280 is configured to detect at least one parameter of surface 270 of object 210 and/or collect data associated with surface 270 of object 210. For example, in one embodiment, scanner 280 is configured to transmit a laser towards surface 270 of object 210 and/or detect a laser reflected from surface 270 of object 210. Particularly, the laser is transmitted and/or reflected within approximately 30° of normal relative to surface 270 of object 210 (i.e., between approximately 60° and approximately 120° relative to surface 270 of object 210). More particularly, the laser is transmitted and/or reflected substantially normal relative to surface 270 of object 210. Alternatively, the laser may be transmitted and/or reflected in any orientation that enables inspection system 200 to function as described herein.

In the example embodiment, the data is associated with a plurality of positions, such that a surface profile associated with surface 270 of object 210 may be determined based on the data. The data enables surface 270 and/or object 210 to be reverse engineered. For example, in one embodiment, a three-dimensional map of surface 270 and/or a point cloud associated with surface 270 may be generated within the predetermined coordinate system associated with robotic device 220 based on the data. The three-dimensional map and/or point cloud is used, for example, to generate and/or modify computer-aided design (CAD) data, generate and/or modify a numerically-controlled (NC) path, and/or generate and/or modify a tool path for inspecting object 210 based on the surface profile.

In one embodiment, a plurality of points adjacent to object 210 that define the tool path are generated and/or modified within the predetermined coordinate system associated with robotic device 220, such that scanner 280 and a tool operating in accordance with the tool path is associated with a common coordinate system. For example, the surface profile enables surface normal to be calculated for a plurality of coordinates along surface 270 of object 210. In the example embodiment, robotic device 220 is maintained in alignment with object 210, either by not being moved relative to object 210 or, if moved, by being realigned with object 210. Accordingly, in the example embodiment, the measurements made by scanner 280 may be used to precisely design the tool path.

In the example embodiment, an inspection tool 340 is removeably coupleable to robotic device 220 such that, when inspection tool 340 is coupled to robotic device 220, robotic device 220 is configured to automatically move inspection tool 340 along the tool path. In the example embodiment, inspection tool 340 moves from a first point of the plurality of points adjacent to object 210 that define the tool path towards a second point of the plurality of points adjacent to object 210 that define the tool path.

Inspection tool 340 may be, without limitation, an optical sensor, a camera, an infrared sensor, an ultrasonic sensor, an eddy current sensor, a vibration sensor, a magnetometer, a laser scanner, a temperature probe, a microphone, a speaker, a capacitance-based gap measurement meter, an electrical multimeter, a voltage meter, a resistance meter, a current meter, a conductivity meter, a static charge meter, and/or any combination of the aforementioned components. In one embodiment, inspection tool 340 includes and/or is coupled to at least one accelerometer that measures linear acceleration and/or a gyroscope that measures rotational velocity. In at least one embodiment, scanner 280 and inspection tool 340 are the same component.

In the example embodiment, inspection tool 340 is configured to perform a non-destructive inspection of object 210. In the example embodiment, inspection tool 340 is configured to detect at least one parameter of surface 270 of object 210 and/or collect data associated with surface 270 of object 210. In one embodiment, inspection tool 340 is coupled to the same robotic device 220 that scanner 280 was and/or is coupled to, such that inspection tool 340 and scanner 280 are operated within a common coordinate system.

Figure 3:
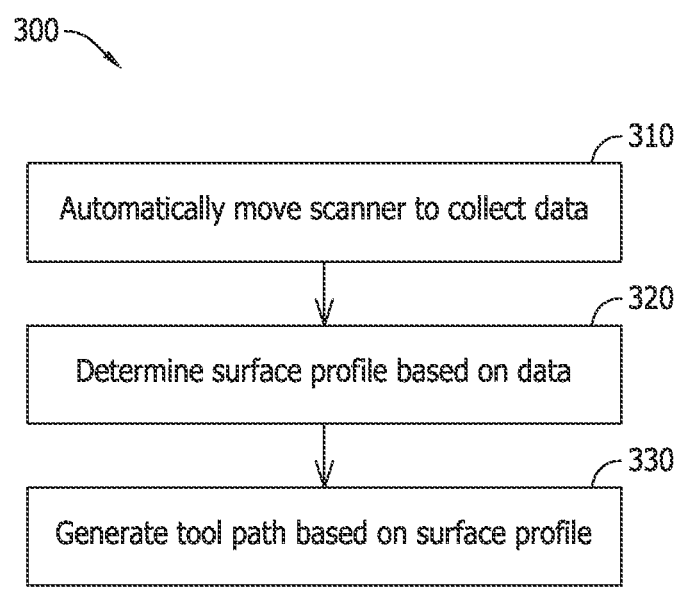
FIG. 3 is a flow chart illustrating an example method for automatically inspecting an object using the example inspection system shown in FIG. 2.

FIG. 3 is a flow chart illustrating an example method 400 for automatically inspecting an object using inspection system 200. In the example embodiment, scanner 280 is coupled to robotic device 220 and, during operation, scanner 280 is moved 410 to collect data associated with surface 270 of object 210. In one embodiment, object 210 is stabilized by mounting object 210 to facilitate reducing flexure movement and/or vibration of object 210 and/or robotic device 220 is stabilized in position with respect to object 210 to facilitate reducing relative movement between robotic device 220 and object 210.

In one embodiment, scanner 280 is moved 410 within the predetermined coordinate system associated with robotic device 220 in a plurality of passes. Each pass of the plurality of passes is associated with a respective portion of surface 270 of object 210. As scanner 280 is moved over and/or adjacent to surface 270 of object 210, position data associated with surface 270 is detected and/or recorded. In one embodiment, the position data is detected and/or recorded at predetermined intervals.

In the example embodiment, a surface profile associated with surface 270 of object 210 is determined 420 based on the data. For example, in one embodiment, a three-dimensional map and/or point cloud of surface 270 of object 210 is generated within the predetermined coordinate system associated with robotic device 220 based on the position data.

In the example embodiment, a tool path for inspecting surface 270 of object 210 is generated 430 based on the surface profile. For example, in one embodiment, the tool path is generated 430 within the predetermined coordinate system associated with robotic device 220. In one embodiment, the tool path is a numerically-created path based on a plurality of points that define the tool path.

In one embodiment, scanner 280 is decoupled from robotic device 220, and inspection tool 340 is coupled to robotic device 220. In the example embodiment, inspection tool 340 is automatically moved along the tool path to perform a non-destructive inspection of object 210. In one embodiment, robotic device 220 is actuated to desirably position, orient, and/or move inspection tool 340 relative to object 210 for inspection and/or evaluation. Position data detected by scanner 280 may be used to enable partial and/or full automation of the inspection process.

Figure 4:
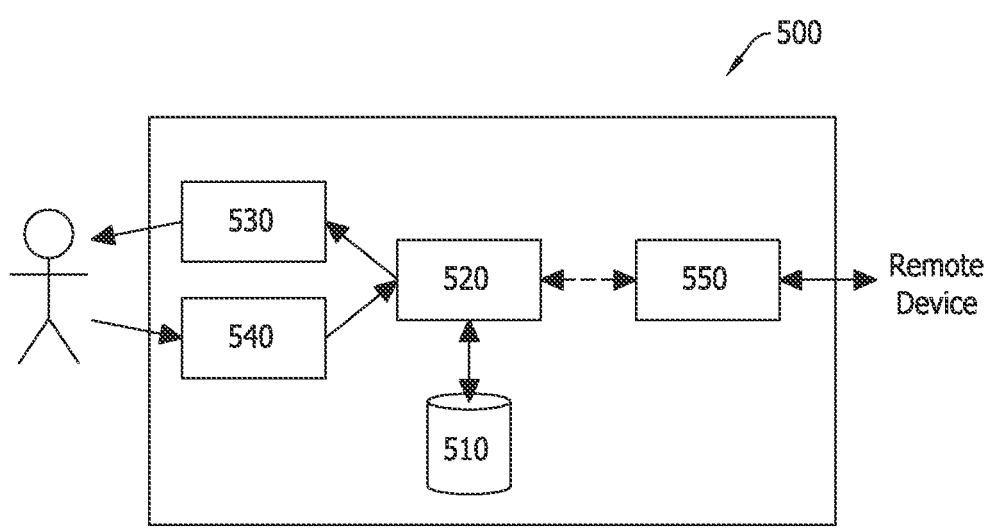
FIG. 4 is a schematic illustration of an example computer device that may be used with the inspection system shown in FIG. 2 for implementing the method shown in FIG. 3.

FIG. 4 is a schematic illustration of an example computer system 500, such as controller 230, that may be used with inspection system 200. In the example embodiment, computer system 500 includes a memory device 510 and a processor 520 coupled to memory device 510 for use in executing instructions. More specifically, in the example embodiment, computer system 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the example embodiment, memory device 510 includes one or more devices (not shown) that enable information such as executable instructions and/or other data to be selectively stored and retrieved. In the example embodiment, such data may include, but is not limited to, motion instructions, CAD files, NC paths, translated NC paths, mapping data, modeling data, operational data, and/or control algorithms. In the example embodiment, computer system 500 is configured to automatically inspect object 210 using inspection system 200. Alternatively, computer system 500 may use any algorithm and/or method that enable the methods and systems to function as described herein. Memory device 510 may also include one or more computer readable media, such as, without limitation, dynamic random access memory (DRAM), static random access memory (SRAM), a solid state disk, and/or a hard disk.

In the example embodiment, computer system 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 530 includes one or more display devices.

Computer system 500, in the example embodiment, includes an input interface 540 for receiving input from the user. For example, in the example embodiment, input interface 540 receives information suitable for use with the methods described herein. Input interface 540 is coupled to processor 520 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 530 and as input interface 540.

In the example embodiment, computer system 500 includes a communication interface 550 that is coupled to processor 520. In the example embodiment, communication interface 550 communicates with at least one remote device, for example robotic device 220. For example, communication interface 550 may use, without limitation, a wired network adapter, a wireless network adapter, and/or a mobile telecommunications adapter. A network (not shown) used to couple computer system 500 to the remote device may include, without limitation, the Internet, a local area network (LAN), a wide area network (WAN), a wireless LAN (WLAN), a mesh network, and/or a virtual private network (VPN) or other suitable communication means.

The embodiments described herein relate generally to non-destructive inspection systems and, more particularly, to methods and systems for automatically inspecting an object. In one embodiment, a system includes a robotic device, a scanner coupleable to the robotic device such that the robotic device is configured to automatically move the scanner to collect data associated with a surface of the object, and a computer system configured to determine a surface profile associated with the surface of the object based on the data, and generate a tool path for inspecting the object based on the surface profile. The embodiments described herein enable objects to be inspected automatically and systematically, thereby reducing a number of touches by a user operator. Accordingly, the embodiments described herein facilitate increasing accuracy and/or precision associated with inspections, decreasing inspection time, and/or increasing throughput and/or productivity.

Example embodiments of methods and systems for automatically inspecting an object are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for automatically inspecting an object, the method implemented using a computer system that includes a processor in communication with a memory device, the method comprising:

automatically moving, by the processor controlling a robotic device for moving a plurality of tools, a scanner on a plurality of passes over respective portions of a surface of the object, the scanner coupleable to the robotic device and movable within a predetermined coordinate system associated with the robotic device to collect measurement data associated with the surface of the object at predetermined time intervals and during the plurality of passes, wherein the processor does not initially have a stored computer model of the object in the memory device;

determining, by the processor, a surface profile associated with the surface of the object based on the measurement data collected by the scanner;

storing, by the processor, the surface profile in the memory device as the computer model of the object;

generating, by the processor, a tool path for inspecting the surface of the object based on the surface profile, the tool path being within the predetermined coordinate system; and automatically moving, by the processor, an inspection tool comprising an ultrasonic sensor coupleable to the robotic device, along the tool path to perform a non-destructive inspection of the surface of the object, such that the inspection tool and scanner are operated within a common coordinate system.

2. A method in accordance with claim 1 further comprising:

coupling the scanner to the robotic device; and
decoupling the scanner from the robotic device.

3. A method in accordance with claim 1, wherein determining the surface profile further comprises generating a three-dimensional map of the surface within a predetermined coordinate system associated with the robotic device.

4. A method in accordance with claim 1, wherein generating the tool path further comprises determining a plurality of points adjacent to the object, wherein the plurality of points define the tool path.

5. A method in accordance with claim 1, wherein the tool path includes a plurality of coordinates associated with the surface of the object, and wherein the tool path further includes surface normal data for each coordinate of the plurality of coordinates.

6. A system for automatically inspecting an object, the system comprising:

a robotic device for coupling to and moving a plurality of tools;

a scanner coupleable to the robotic device, such that the robotic device is configured to automatically move the scanner within a predetermined coordinate system associated with the robotic device on a plurality of passes over respective portions of a surface of the object, the scanner configured to collect measurement data associated with the surface of the object at predetermined time intervals during the plurality of passes;

a computer device configured to:

determine a surface profile associated with the surface of the object based on the measurement data collected by the scanner, wherein the computer device does not initially have a stored computer model of the object in a memory device;

store the surface profile in the memory device as the computer model; and generate a tool path for inspecting the surface of the object based on the surface profile, the tool path being within the predetermined coordinate system associated with the robotic device; and an inspection tool comprising an ultrasonic sensor coupleable to the robotic device, the ultrasonic sensor automatically moved along the tool path by the robotic device to perform a non-destructive inspection of the object, such that the inspection tool and scanner are operated within a common coordinate system.

7. A system in accordance with claim 6, wherein the computer device is further configured to generate a three-dimensional map of the surface within the predetermined coordinate system associated with the robotic device.

8. A system in accordance with claim 6, wherein the computer device is further configured to determine a plurality of points adjacent to the object, wherein the plurality of points define the tool path.

9. One or more computer-readable storage media having computer-executable instructions embodied thereon, wherein, when executed by at least one processor, the computer-executable instructions cause the processor to:

automatically move a robotic device for moving a plurality of tools, a scanner within a predetermined coordinate system associated with the robotic device on a plurality of passes over respective portions of a surface of an object to collect measurement data associated with the surface of the object at predetermined time intervals and during the plurality of passes, wherein the processor does not initially have a stored computer model of the object in a memory device;

determine a surface profile associated with the surface of the object based on the measurement data collected by the scanner;

store the surface profile in the memory device as the computer model of the object;

generate a tool path for inspecting the surface of the object based on the surface profile, the tool path being within the predetermined coordinate system associated with the robotic device; and automatically move an inspection tool comprising an ultrasonic sensor coupleable to the robotic device along the tool path to perform a non-destructive inspection of the object, such that the inspection tool and scanner are operated within a common coordinate system.

10. One or more computer-readable storage media in accordance with claim 9, wherein the computer-executable instructions further cause the processor to generate a three-dimensional map of the surface within the predetermined coordinate system associated with the robotic device.

11. One or more computer-readable storage media in accordance with claim 9, wherein the computer-executable instructions further cause the processor to determine a plurality of points adjacent to the object, wherein the plurality of points define the tool path.

12. One or more computer-readable storage media in accordance with claim 9, wherein the computer-executable instructions further cause the processor to:

automatically couple the scanner to the robotic device;

automatically decouple the scanner from the robotic device; and automatically couple the inspection tool to the robotic device.

* * * * *